United States Patent [19]

Setlur et al.

[11] Patent Number: 5,956,675
[45] Date of Patent: Sep. 21, 1999

[54] METHOD AND APPARATUS FOR WORD COUNTING IN CONTINUOUS SPEECH RECOGNITION USEFUL FOR RELIABLE BARGE-IN AND EARLY END OF SPEECH DETECTION

[75] Inventors: Anand Rangaswamy Setlur, Warrenville; Rafid Antoon Sukkar, Aurora, both of Ill.

[73] Assignee: Lucent Technologies Inc., Murray Hill, N.J.

[21] Appl. No.: 08/903,633

[22] Filed: Jul. 31, 1997

[51] Int. Cl.[6] ............................... G10L 5/00; H04M 3/50
[52] U.S. Cl. ........................ 704/231; 704/253; 704/254
[58] Field of Search ................................ 704/215, 231, 704/243, 244, 246, 247, 248, 249, 251, 252, 253, 254; 379/88.03

[56] References Cited

U.S. PATENT DOCUMENTS

| 4,914,692 | 4/1990 | Hartwell et al. | 379/410 |
| 5,155,760 | 10/1992 | Johnson et al. | 379/67.1 |
| 5,226,148 | 7/1993 | Littlewood | 395/185.03 |
| 5,708,704 | 1/1998 | Fisher | 379/410 |
| 5,799,065 | 8/1998 | Junqua et al. | 379/88.03 |

OTHER PUBLICATIONS

"A Frame–Synchronous Network Search Algorithm for Connected Word Recognition", by Chin–Hui Lee and Lawrence R. Rabiner, *IEEE Transactions on Acoustics, Speech, and Signal Processing*, vol. 37, No. 11, Nov. 1989, pp. 1649–1658.

"A Wave Decoder for Continuous Speech Recognition", by Eric Burhke, Wu Chou and Qiru Zhou, *Proc. ICSLP '96*, pp. 1–4.

*Primary Examiner*—David R. Hudspeth
*Assistant Examiner*—Martin Lerner
*Attorney, Agent, or Firm*—Jack R. Penrod

[57] ABSTRACT

Speech recognition technology has attained maturity such that the most likely speech recognition result has been reached and is available before an energy based termination of speech has been made. The present invention innovatively uses the rapidly available speech recognition results to provide intelligent barge-in for voice-response systems, to count words to output sub-sequences to provide paralleling and/or pipelining of tasks related to the entire word sequence, and to count words to provide rapid, speech recognition based termination of speech processing and outputting of the recognized word sequence.

10 Claims, 4 Drawing Sheets

METHOD AND APPARATUS FOR WORD COUNTING IN CONTINUOUS SPEECH RECOGNITION USEFUL FOR RELIABLE BARGE-IN AND EARLY END OF SPEECH DETECTION

TECHNICAL FIELD

The invention relates to an automatic speech recognition method and apparatus and more particularly to a method and apparatus that speeds up recognition of connected words.

DESCRIPTION OF THE PRIOR ART

Various automatic speech recognition methods and systems exist and are widely known. Methods using dynamic programming and Hidden Markov Models (HMMs) are known as shown in the article *Frame-Synchronous Network Search Algorithm for Connected Word Recognition* by Chin-Hui Lee and Lawrence R. Rabiner published in the IEEE Transactions on Acoustics, Speech, and Signal Processing Vol. 37, No. 11 November 1989. The Lee-Rabiner article provides a good overview of the state of methods and systems for automatic speech recognition of connected words in 1989.

An article entitled *A Wave Decoder for Continuous Speech Recognition* by E. Buhrke, W. Chou and Q. Zhou published in the Proceedings of ICSLP in October 1996 describes a technique known as beam searching to improve speech recognition performance and hardware requirements. The Buhrke-Chou-Zhou article also mentions an article by D. B. Paul entitled "An Efficient A* Stack Decoder . . . " which describes best-first searching strategies and techniques.

Speech recognition, as explained in the articles mentioned above, involves searching for a best (i.e. highest likelihood score) sequence of words, $W_1-W_n$, that corresponds to an input speech utterance. The prevailing search algorithm used for speech recognition is the dynamic Viterbi decoder. This decoder is efficient in its implementation. A full search of all possible words to find the best word sequence corresponding to an utterance is still too large and time consuming. In order to address the size and time problems, beam searching has often been implemented. In a beam search, those word sequence hypotheses that are likely, that is within a prescribed mathematical distance from the current best score, are retained and extended. Unlikely hypotheses are 'pruned' or removed from the search. This pruning of unlikely word sequence hypotheses has the effect of reducing the size and time required by the search and permits practical implementations of speech recognition systems to be built.

At the start of an utterance to be recognized, only those words that are valid words to start a sequence based on a predetermined grammar can be activated. At each time frame, dynamic programming using the Viterbi algorithm is performed over the active portion of the word network. It is worth noting that the active portion of the word network varies over time when a beam search strategy is used. Unlikely word sequences are pruned away and more likely word sequences are extended as specified in a predetermined grammar. These more likely word sequences are extended as specified in the predetermined grammar and become included in the active portion of the word network. At each time frame the system compiles a linked list of all viable word sequences into respective nodes on a decoding tree. This decoding tree, along with its nodes, is updated for every time frame. Any node that is no longer active is removed and new nodes are added for newly active words. Thus, the decoding tree maintains viable word sequences that are not pruned away by operation of the beam search algorithm by means of the linked list. Each node of the decoding tree corresponds to a word and has information such as the word end time, a pointer to the previous word node of the word sequence and the cumulative score of the word sequence stored therein. At the end of the utterance, the word nodes with the best cumulative scores are traversed back through their sequences of pointer entries in the decoding tree to obtain the most likely word sequence. This traversing back is commonly known in speech recognition as 'backtracking'.

A common drawback of the known methods and systems for automatic speech recognition is the use of energy detectors to determine the end of a spoken utterance. Energy detection provides a well known technique in the signal processing and related fields for determining the beginning and ending of an utterance. An energy detection based speech recognition method 200 is shown in FIG. 2. Method 200 uses a background time framing arrangement (not shown) to digitize the input signal, such as that received upon a telephone line into time frames for speech processing. Time frames are analyzed at step 202 to determine if any frame has energy which could be significant enough to start speech processing. If a frame does not have enough energy to consider, step 202 is repeated with the next frame, but if there is enough energy to consider the content of a frame, method 200 progresses to steps 204–210 which are typical speech recognition steps. Next, at step 220, the frame(s) that started the speech recognition process are checked to see if both the received energy and any system played aural prompt occurred at the same time. If the answer is yes, a barge in condition has occurred and the aural prompt is discontinued at step 222 for the rest of the speech processing of the utterance. Next, either from a negative determination at step 220 or a prompt disable at step 222, step 224 determines if a gap time without significant energy has occurred. Such a gap time signifies the end of the present utterance. If it has not occurred, that means there is more speech to analyze and the method returns to step 204, otherwise the gap time with no energy is interpreted as an end of the current utterance and backtracking is started in order to find the most likely word sequence that corresponds to the utterance. Unfortunately, this gap time amounts to a time delay that typically ranges from one to one and a half seconds. For an individual caller this delay is typically not a problem, but for a telephone service provider one to one and a half seconds on thousands of calls per day, such as to automated collect placing services, can add up. On 6000 calls, one and one-half seconds amounts to two and one-half hours of delay while using of speech recognition systems. For heavily used systems this one-to one and one-half second delay causes the telephone service provider to buy more speech recognizers or lose multiple hours of billable telephone service. Further, since the backtracking to find the most likely word sequence does not begin until the end-of-utterance determination has been made based on the energy gap time, the use of partial word sequences for parallel and/or pipelining processes is not possible.

It is an object of the present invention to provide a method for determining an end of an utterance that is faster than speech energy gap timing.

It is another object of the present invention to provide a method for reliably detecting a group of words within an utterance in real time as partial word sequences of the utterance to allow parallel processing of the first portion of the utterance.

It is another object of the present invention to provide reliable barge-in over aural prompts.

SUMMARY OF THE INVENTION

Briefly stated, in accordance with one embodiment of the invention, the foregoing objects are achieved by providing a method having a step of determining if a speech utterance has started, if an utterance has not started then obtaining next frame and re-running this speech utterance start determining step. If an utterance has started, the next step is obtaining a speech frame of the speech utterance that represents a frame period that is next in time. Next, features are extracted from the speech frame which are used in speech recognition. The next step is performing dynamic programming to build a speech recognition network followed by the step of performing a beam search using the speech recognition network. The next step is updating a decoding tree of the speech utterance after the beam search. The next step is determining if a first word of the speech utterance has been received and if it has been received disabling any aural prompt and continuing to the next step, otherwise, if a first word has not been determined, continuing to the next step. This next step is determining if N words have been received and if N words have not been received then returning to the step of obtaining the next frame, otherwise continuing to the next step. Since N is the maximum word count of the speech utterance signifies the end of the speech utterance, the next step is backtracking through the beam search path having the greatest likelihood score to obtain a word string having a greatest likelihood of corresponding to the received speech utterance. After the string has been obtained, the next step is outputting the word string.

In accordance with another aspect of the invention, the aforementioned objects are achieved by providing a system for speech recognition of a speech utterance including a means for determining if the speech utterance has started, a means responsive to said speech utterance start determining means for obtaining a speech frame of the speech utterance that represents a frame period that is next in time; a means for extracting features from said speech frame; a means for building a speech recognition network using dynamic programming; a means for performing a beam search using the speech recognition network; a means for updating a decoding tree of the speech utterance after the beam search; a means for determining if a first word of the speech utterance has been received and if it has been received disabling any aural prompt; a means for determining if N words have been received to quickly end further speech recognition processing of the speech utterance; a means responsive to said N word determining means for backtracking through the beam search path having the greatest likelihood score to obtain a word string having a greatest likelihood of corresponding to the received speech utterance ; and a means for outputting said word string. In accordance with a specific embodiment of the invention, such a system is a provided by a processor running a program stored that is stored in and retrieved from a connected memory.

DETAILED DESCRIPTION

Figure 1:
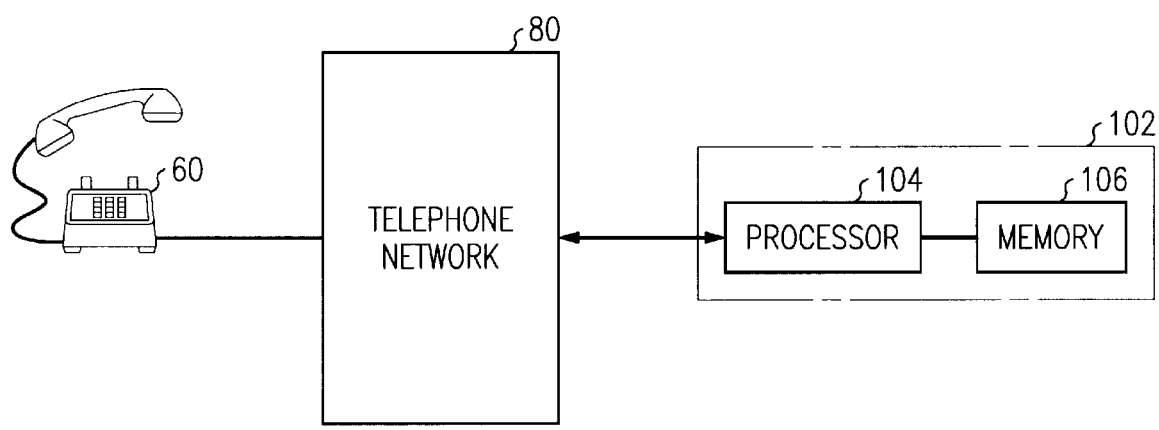
FIG. 1 is a block diagram of system including a speech recognition apparatus according to the invention.

Referring now to FIG. 1, a block diagram of an arrangement 10 for using a system 102 according to the present invention is shown.

The system 102 has a processor 104 which follows programs stored in memory 106. Multiple instances of system 102 may be implemented on one circuit board, thereby providing multiple channels for speech recognition. Memory 106 includes all types of memory, e.g. ROM, RAM and bulk storage, to store the speech recognition program and supporting data. The system 102 continuously takes in data from telephone network 80, divides the data into time frames and then processes each time frame to provide numerous characteristics and coefficients of the received input signals to be analyzed by speech recognition methods provided by the processor and its stored programs. As mentioned in the background, these speech processing techniques include hidden Markov models (HMMs) and beam search techniques.

Figure 2:
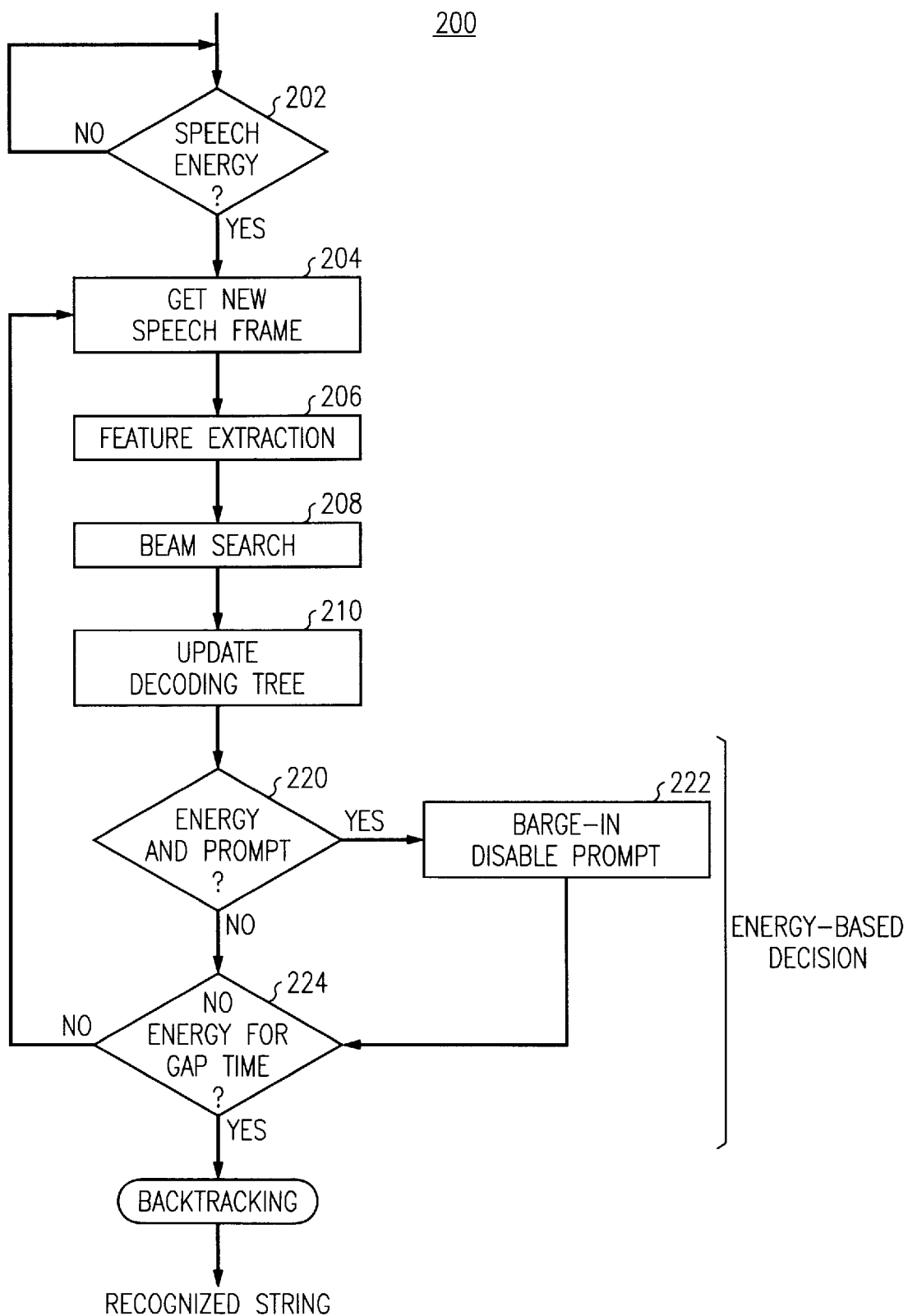
FIG. 2 is a flow diagram of a prior art energy level triggered speech recognition method.

FIG. 2, as mentioned in the background, shows a known method 200 for speech recognition. The method 200 can be implemented for use on the system 102 shown in FIG. 1.

Figure 3:
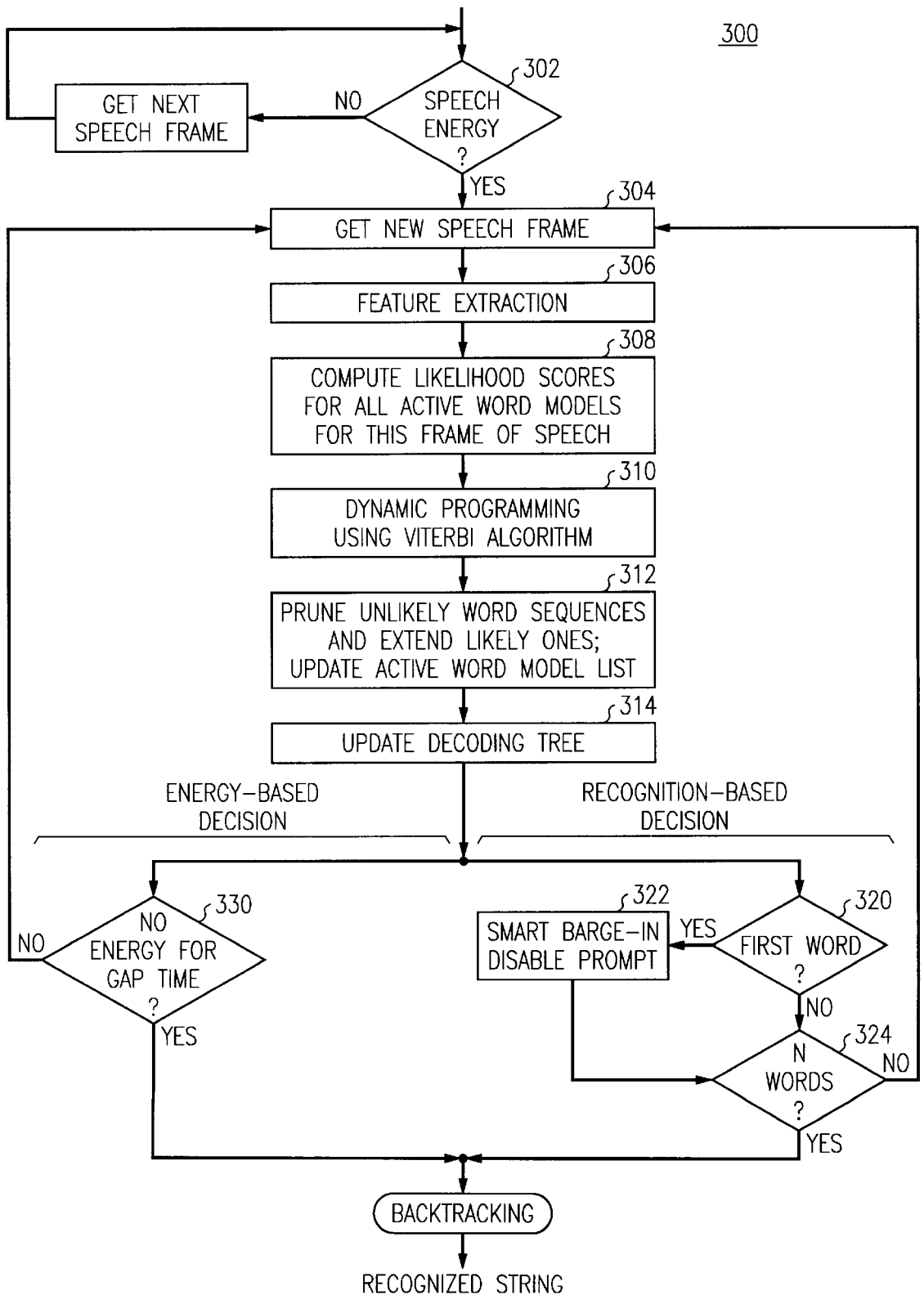
FIG. 3 is a flow diagram of an energy and recognition based speech recognition method.

Referring now to FIGS. 1 and 3, another method that could be implemented using the system 102 is shown. Method 300 is a method according to the present invention. Method 300 starts with step 302 in which a determination is made whether or not energy that may be speech has been received by the system 102. If the determination is no energy which may be speech has been received, then step 302 is repeated for the next period of time. Thus, step 302, like step 202 in FIG. 2, requires a time framing process to continuously frame the signals received from the telephone network 80. Often these frames will be empty or have only noise signals. In such cases, the energy level is low and so step 302 will not consider an empty or low energy level frame as speech to be recognized. If there is a greater amount of noise or someone making sounds or some kind of utterance, such as coughing, breathing or talking, step 302 will determine that enough speech energy is present to start speech recognition processes and the speech recognition process begins. Next, step 304 sequentially loads the latest time frame: if this is just the beginning this is the first frame. After the first frame, step 304 will sequentially load all the time frames until speech processing of the present utterance is completed. After loading in step 304, each frame has its features extracted and stored at step 306. This feature extraction is typical feature extraction.

In step 308 the features extracted are compared to models, such as hidden Markov models, of words and word sequences of the predetermined grammar. As the extracted features are compared to the word models that are active, likelihood scores are compiled in step 308. Step 310 takes the active node model scores and performs dynamic programming to build a word network of possible word sequences that the utterance being recognized could be. This dynamic programming uses a Viterbi algorithm in its operation. Once the dynamic programming for the present frame is completed, a beam search is performed at step 312. This beam search prunes away unlikely word sequences and extends likely word sequences and stores an updated active word list. Next, step 314 updates a decoding tree built to provide at the end of the utterance the most likely word sequence corresponding to the utterance. After step 314, the method 300 operates with two parallel paths. Both paths are active and are both looking for an end of the utterance according to their respective definitions of an end of an utterance.

Step 320 determines if a first word of the predetermined grammar has been recognized within the utterance. This determination is speech recognition based, not energy based. This determination is made by examining the viable word sequences contained in the decoding tree by traversing through pointers that are associated with non-silence nodes of the decoding tree. It is determined that the first word has been spoken if all the viable paths contain at least one non-silence word that is in the predetermined grammar. If a first word of the grammar has been spoken, then a speech recognition based barge-in is declared and any aural prompt is disabled at step 322. If this is not the first word or if the next step is after first word process step 322, method 300 progresses to step 324. It is worth noting that the recognition based barge-in of steps 320 and 322 is slower in the absolute sense than energy detection methods, however, for words or sounds that are not part of the pre-specified grammar speech recognition based barge-in is more reliable. This improved barge-in reliability means the aural prompt, which is stopped for a barge-in, will not be stopped for coughs, side conversations or other sounds that are not related to the expected response to the aural prompt. Thus, a speaker will not be confused and slowed down by an aural prompt inadvertently stopped some sound that is other than true barge-in speech.

At step 324 a respective count of the number of words in the most likely word of sequences are made. In step 324 the decoding tree contents for the present frame and counts of the number of words of all the viable word sequences are examined. This examination is performed by examining the viable word sequences contained in the decoding tree and then traversing through pointers that are associated with non-silence nodes of the decoding tree. It is determined that n words have been spoken if each of the word sequences in the decoding tree has exactly n words in its respective sequence. However, if at least one of the viable word sequences has other than n words then the examination does not conclude with a word count n for the present frame. When a word count of n is reached, word count n is compared with a maximum word count N. If the count of n is equal to N, the maximum expected number of words in the sequence, then the speech processing of the utterance is declared to be completed and backtracking is started in order to output the most likely word sequence. The outputting of the most likely word sequence of N words ends the task of recognizing the present utterance. This speech recognition based utterance termination saves approximately one second for every word sequence processed with no detrimental effect on the accuracy of the result.

Running in parallel with steps 320–324 is step 330, which measures the gap time between the last frame containing significant energy and the present empty frame. If that gap time is exceeded, that means the utterance stopped before the expected number of words, N, were recognized. If the gap time is determined before the Nth word is determined, then step 330 declares the utterance completed and backtracking to output the most likely word sequence is started. Typically, in method 300 a gap time termination will signify an error, but the output of the recognizer may be accepted or read back to the utterer by means of a speech synthesizer (not shown). Examples of N, would be long distance telephone numbers, and the 16 digits on most credit cards.

Figure 4:
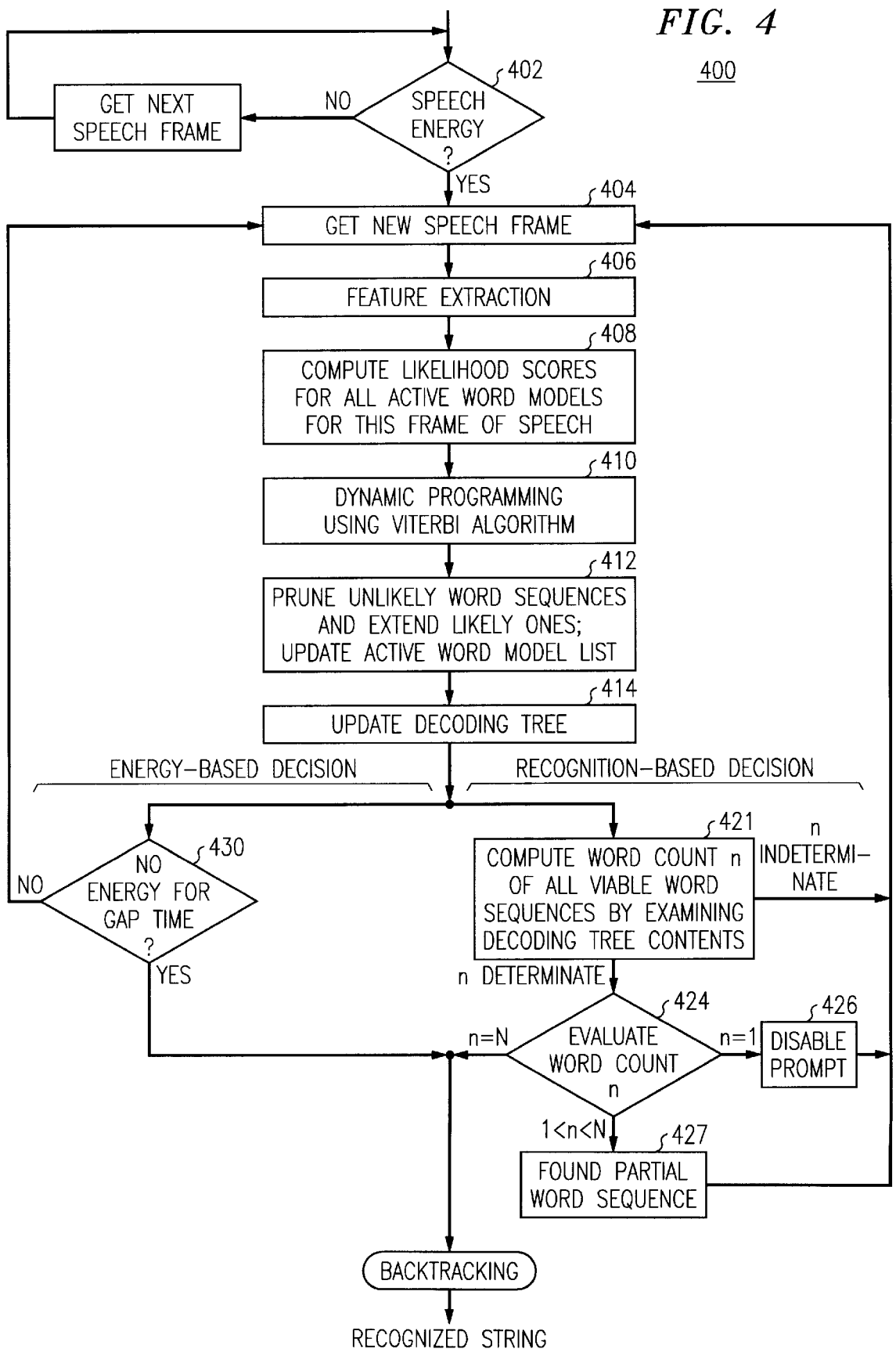
FIG. 4 is a flow diagram of a recognition based speech recognition method for outputting partial results of an utterance.

Referring now to FIG. 4, another embodiment of the invention is shown. Method 400 is very similar to method 300. Steps 402–414 of method 400 are substantially identical to steps 302–314 of method 300 and so will not be further discussed.

After decoding tree updating step 414, method 400 splits into two parallel paths as method 300. Step 421 examines the decoding tree contents for the present frame and counts the number of words of all the viable word sequences. This examination is performed by examining the viable word sequences contained in the decoding tree and then traversing through pointers that are associated with non-silence nodes of the decoding tree. It is determined that n words have been spoken if each of the word sequences in the decoding tree has exactly n words in its respective sequence. However, if at least one of the viable word sequences has other than n words then the examination does not conclude with a word count n for the present frame. When a word count of n is reached by step 421 the word count n is outputted for use by step 424, and method 400 continues to step 424. At step 424 the word count n is compared with 1 and with a maximum word count N. The comparison with 1 is very similar to step 320 of method 300 in that if a first word has been spoken and the present word is the first word, then a speech recognition based barge-in is declared and any aural prompt is disabled at step 426. If at step 424 the word count n comparison shows n is greater than 1 but less than N then a valid word sub-sequence or group exists, otherwise agreement on n would not exist and an indeterminate n would be the result of step 421 and method 400 would return to step 404. The advantage of this part of the method is that for the ten word long distance telephone number or sixteen word credit card number as soon as the first three or four words have stabilized, they are available for output before the end of the word sequence. These three, four, or even seven word groups can be outputted before the entire utterance and entire speech recognized word sequence is completed. Thus, area codes, area codes and exchanges, or credit card company access lines could be accessed and awaiting the rest of the word sequence when it is completed. This allows pipelining of data recognized during early portions of an utterance to be used immediately and the rest of the utterance to complete the pipelined use when it arrives. After either step 426 or step 427, method 400 returns to step 404 to process the next time frame of data until the end of the utterance is attained.

If the result of step 421 is a word count n=N, then the maximum count of words for the utterance has been reached and speech recognition can stop processing and start backtracking to find the most word sequence that corresponds to the utterance. When n=N this backtracking can begin immediately, there is no need to wait for the one to one and one-half seconds used by the energy detecting decision making in order to conclude that the utterance is completed. The reason that the word counting works is that if the correct number of words have been recognized, then processing can end and backtracking for the most likely answer begin.

It is worth noting that a partial word sequence can also be used with a look-up table to change the maximum word count N where that is appropriate. For example, if one credit card company has a non-standard number of words in its word sequence, then recognition of a partial word sequence indicating one of that credit card company's accounts will cause the method 400 to change the maximum word count N accordingly—before the last word of the utterance is reached. In a similar manner for telephone prefixes, a prefix that is not an area code or exchange can be used to change from the usual ten digit area code and local number to a maximum word count that is larger or smaller as the need may arise. Further, partial word sequences that are clearly not area codes or prefixes but could be credit card company designators can be used to shift function from telephone number recognition to credit card number recognition. The opposite switching from credit card number taking function to telephone number taking can also be provided. For such switching, the maximum word count N typically has to be changed.

Method 400, as method 300, has an energy based decision making branch running in parallel with steps 421–427. Step 430, measures the gap time between the last frame with significant energy in it and the present empty frame. If this gap time is exceeded, then the utterance has stopped before the expected number of words, n, were recognized. If the gap time is determined before the Nth word is determined, then step 430 declares the utterance completed and backtracking to output the most likely word sequence is begun. Typically, in method 400 an energy based gap time termination will signify an error, but the output of the recognizer may be accepted for use or read back to the speaker by means of a speech synthesizer (not shown), as appropriate.

At the end of method 400, determined either by speech recognition or energy detection, a backtracking operation is performed on the decoding tree to obtain the most likely word sequence that corresponds to the input utterance, and that word sequence is outputted by method 400.

Thus, it will now be understood that there has been disclosed a faster speech recognition method and apparatus through the use of word counting. This faster speech recognition method and apparatus can output partial word sequences for parallel or pipelining of tasks associated with the speech recognition. Further, this method and apparatus can provide more reliable barge-in operation for voice response systems. While the invention has been particularly illustrated and described with reference to preferred embodiments thereof, it will be understood by those skilled in the art that various changes in form, details, and applications may be made therein. It is accordingly intended that the appended claims shall cover all such changes in form, details and applications which do not depart from the true spirit and scope of the invention.

What is claimed is:

1. A method comprising the steps of:
   a. determining if a speech utterance has started, if an utterance has not started then obtaining next frame and re-running step a, otherwise continuing to step b;
   b. obtaining a speech frame of the speech utterance that represents a frame period that is next in time;
   c. extracting features from the speech frame;
   d. performing dynamic programming to build a speech recognition network;
   e. performing a beam search using the speech recognition network;
   f. updating a decoding tree of the speech utterance after the beam search;
   g. determining if a first word of the speech utterance has been received and if it has been received disabling any aural prompt and continuing to step h, otherwise if first has not been determined continuing to step h;
   h. determining if n words have been received and if n words have not been received then returning to step b, otherwise continuing to step i;
   i. backtracking through the beam search path having the greatest likelihood score to obtain a string having a greatest likelihood of corresponding to the received utterance when speech recognition of the word sequence has completed; and
   j. outputting the string.

2. The method of claim 1, wherein said first word recognized must be a word found in a pre-specified grammar.

3. The method of claim 1, further comprising the step of:
   in parallel with step h, determining if a low energy gap time has been reached in a sequence of frames, and if such a gap time has not been reached returning to step b, and if such a gap time has been reached continuing to step i.

4. A method for speech recognition of comprising the steps of:
   a. determining if a speech utterance has started, if an utterance has not started then returning to the beginning of step a, otherwise continuing to step b;
   b. getting a speech frame that represents a frame period that is next in time;
   c. extracting features from the speech frame;
   d. using the features extracted from the present speech frame to score word models of a speech recognition grammar;
   e. dynamically programming an active network of word sequences using a Viterbi algorithm;
   f. pruning unlikely words and extending likely words to update the active network;
   g. updating a decoding tree;
   h. determining a word count n for this speech frame of the speech utterance;
   i. examining the word count n and if the word count n is equal to one disabling any aural prompt and continuing with step b, if the word count n is greater than one but less than a termination count N continuing with step j; and if the word count n is at least equal to the termination count N continuing with step k;
   j. determining if n words have been determined as recognized by each of the word counts and if n words have not been determined as recognized then returning to step b and if n words have been recognized outputting the n words and returning to step b, otherwise continuing to step i;
   k. determining if the end of the utterance has been reached by determining if the word count of each of the presently active word sequences is equal to the same termination count N and if each of the word counts of the presently active word sequences is equal to N then declaring the utterance ended and continuing to step m, otherwise continuing to step 1;
   l. determining if there has not been any speech energy for a pre-specified gap time and if there has not been any then declaring the utterance ended and continuing to step m, otherwise returning to step b;
   m. backtracking through the various active word sequences to obtain the word sequence with the greatest likelihood of matching the utterance; and
   n. outputting the word sequence corresponding to the greatest likelihood.

5. The method of claim 4, wherein step h further comprises:
   examining all viable word sequences contained in the decoding tree for the present speech frame;
   traversing through pointers that are associated with non-silence nodes of the decoding tree; and
   counting a number of words of all the viable word sequences.

6. The method of claim 4, wherein said said word sequence must be found in a pre-specified grammar.

7. The method of claim 4, further comprising the step of:
   after step j, determining if the partial word sequence corresponds to a word sequence requiring a different maximum word count, and if a different maximum word count is required adjusting the maximum word count N to the different maximum word count.

8. The method of claim 7, wherein the partial word sequence requiring a different maximum word count is a telephone number prefix.

9. An apparatus for speech recognition of a speech utterance comprising:

means for determining if the speech utterance has started, means responsive to said speech utterance start determining means for obtaining a speech frame of the speech utterance that represents a frame period that is next in time;

means for extracting features from said speech frame;

means for building a speech recognition network using dynamic programming;

means for performing a beam search using the speech recognition network;

means for updating a decoding tree of the speech utterance after the beam search;

means for determining if a first word of the speech utterance has been received and if it has been received disabling any aural prompt;

means for determining if N words have been received to quickly end further speech recognition processing of the speech utterance;

means responsive to said N word determining means for backtracking through the beam search path having the greatest likelihood score to obtain a word sequence having a greatest likelihood of corresponding to the received speech utterance ; and means for outputting said word sequence.

10. The apparatus of claim 9, wherein all said means comprises a system having a processor running a program stored in connected memory.

* * * * *